United States Patent [19]
Mount

[11] 3,835,840
[45] Sept. 17, 1974

[54] IMPEDANCE PLETHYSMOGRAPHY METHOD AND APPARATUS

[75] Inventor: Bruce E. Mount, Diamond Bar, Calif.

[73] Assignee: City of Hope, Los Angeles, Calif.

[22] Filed: Sept. 27, 1973

[21] Appl. No.: 401,407

[52] U.S. Cl. ...... 128/2.05 V, 128/2.05 F, 128/2.12, 324/65 R
[51] Int. Cl. .............................................. A61b 5/02
[58] Field of Search ..... 128/2.05 V, 2.05 F, 2.05 R, 128/2.1 Z, 2.1 R; 324/65 R

[56] References Cited
UNITED STATES PATENTS

| | | | |
|---|---|---|---|
| 3,340,867 | 9/1967 | Kubicek et al. | 128/2.05 V |
| 3,548,806 | 12/1970 | Fisher | 128/2.05 R |
| 3,651,318 | 3/1972 | Czekajewski | 128/2.05 F |
| 3,678,922 | 7/1972 | Phillips | 128/2.05 F |

OTHER PUBLICATIONS

Kubicek, "Elec. Imp. Plethys. Monitors Cardiac Output," NASA Tech. Brief, Brief 68-10220, June 1968.
Shirer et al., "Mag. Flowmeter for Cardiac Output," IPE Trans. on Med. Elec., pp. 232-234, Dec. 1959.

*Primary Examiner*—Richard A. Gaudet
*Assistant Examiner*—Lee S. Cohen
*Attorney, Agent, or Firm*—Harris, Kern, Wallen & Tinsley

[57] ABSTRACT

Apparatus and method for noninvasive measurement of volume rate of flow of blood in an artery. A system using an impedance plethysmograph to measure the impedance of a body section, and circuitry having the impedance signal as an input for developing an output signal proportional to the volume rate of blood flow.

11 Claims, 3 Drawing Figures

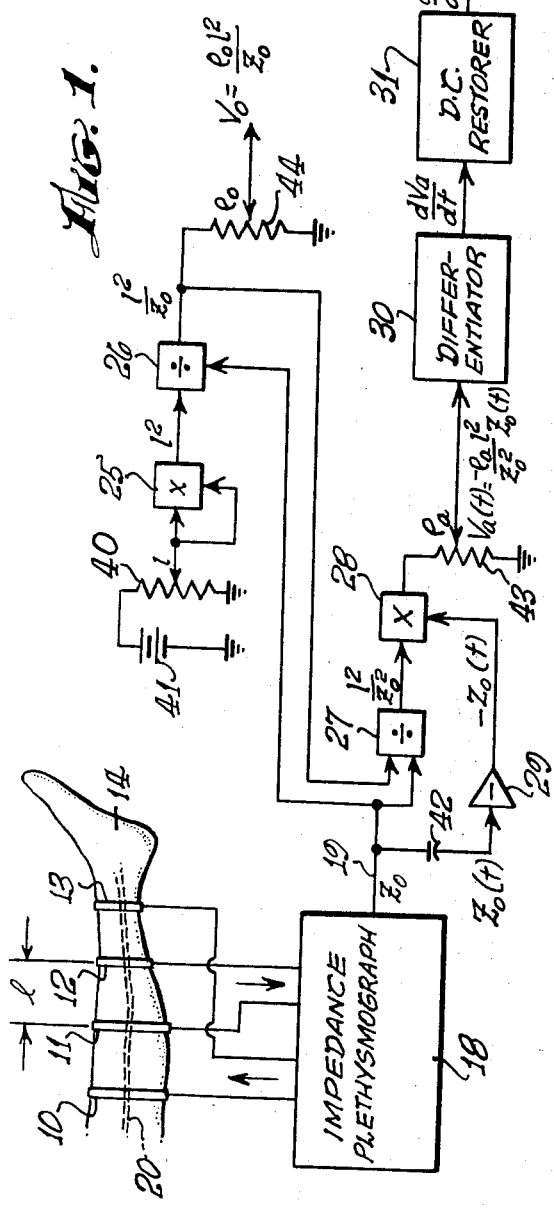
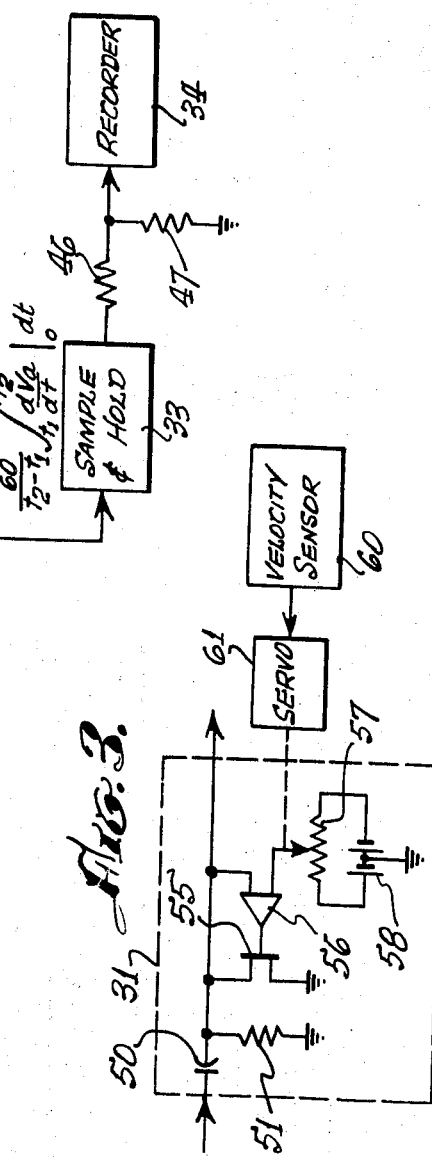
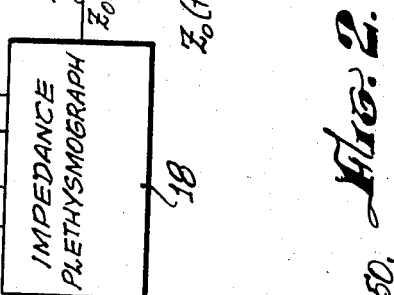

IMPEDANCE PLETHYSMOGRAPHY METHOD AND APPARATUS

BACKGROUND OF THE INVENTION

This invention relates to apparatus and method for measurement of arterial blood flow and in particular, to a noninvasive system, i.e., a system which does not require entry of an instrument into the blood vessel or any other portion of the body.

Impedance plethysmographs have been used for sometime in the noninvasive measurement of certain body characteristics. Impedance plethysmographs are available from several manufacturers and a typical instrument is described in U.S. Pat. No. 3,340,867. Typical instruments include the Minnesota Impedance Cardiograph Model 304 and the Systron-Donner Plethysmograph Model 7700. The operation and use of these instruments are described in brochures for the instruments and in a wide range of publications, typical of which is Clinical Applications of Impedance Plethysmography by Robert D. Allison, from Clinical Medicine, Volume 74, February, 1967, pp. 33–41.

However none of the prior art presently known provides a direct reading of volume rate of flow of arterial blood, and it is an object of the present invention to provide method and apparatus for a more accurate measurement of volume rate of flow of blood in an artery than has heretofore been possible by noninvasive means

SUMMARY OF THE INVENTION

In the present invention, the impedance of a section of the body containing the artery of interest is measured continuously using conventional instrumentation. This impedance value is then used in determining the time rate of change of volume of the artery. A zero reference value is supplied for the arterial-volume time-derivative either by a dc restorer circuit or by a servo controlled by information from a blood-velocity sensor such a Doppler ultrasonic bloodflowmeter. In the dc restorer circuit, the zero baseline will be along the negative peaks of the arterial-volume time-derivative waveform, and by definition, the arterial blood has then been assumed to have no reverse flow, which is very often the case in the extremeties of the human patient, and it has been shown that measurements such as this can be clinically useful. When a closer approximation to total arterial flow is important, the zero reference of the arterial-volume time-derivative waveform can be adjusted according to information obtained from a non-invasive blood-velocity measuring device such as a Doppler ultrasonic bloodflowmeter, which has an output waveform accurately referred to zero, but not necessarily calibrated with respect to volume rate of flow. The zero reference of the impedance-derived arterial-volume time-derivative waveform can be adjusted to the same relative value as the zero reference of the blood velocity waveform. The arterial-volume time-derivative waveform with inserted baseline is then integrated to provide an output signal for storage, recording, and/or further manipulation, with the integrated output signal being substantially proportional either to pulsatile arterial flow (dc restored baseline) or total arterial flow (baseline adjusted using a blood-velocity-measurement device).

BRIEF DESCRIPTION OF THE DRAWING

FIG. 1 is a diagram illustrating a volume measuring system incorporating the presently preferred embodiment of the invention;

FIG. 2 is an electrical schematic of a circuit suitable for the dc restorer of FIG. 1; and FIG. 3 is an electrical schematic of an alternative form of circuit for the dc restorer of FIG. 1.

DESCRIPTION OF THE PREFERRED EMBODIMENT

FIG. 1 illustrates band electrodes 10, 11, 12, 13 on a patient's leg 14. The constant current source of an impedance plethysmograph 18 connected to the outer electrodes 10, 13. The plethysmograph typically may provide an exitation to electrodes 10, 13 at 100 kilohertz and 1 milliampere. The inner electrodes 11, 12 are connected to a voltage sensor in the plethysmograph which in turn provides an output signal at 19 directly proportional to the impedance of the section of length 1 between electrodes 11, 12.

The output $Z_o$ which appears at line 19 is sometimes referred to as the base impedance and typically may be in the order of 40 ohms and varies plus and minus 20 milliohms with the heart beat.

The volume $V_a$ of the artery section 20 of length 1 may be related to the base impedance $Z_o$ as set out in equation 1, where $\rho$ a is the blood resistivity.

$$V_a(t) = -(\rho a\ l^2/Z_o^2)Z_o(t) \qquad (1)$$

It has been found that the volume measurement $V_a(t)$ can be directly related to the volume rate of flow of blood in the artery 20 by first differentiating the volume measurement with respect to time to obtain a time derivative of arterial volume, then providing a zero reference value for this time derivative, and finally integrating the time derivative over a predetermined period of time, obtaining an output value which is essentially proportional to pulsatile arterial flow (zero reference chosen along negative peaks of arterial-volume time-derivative waveform) or total volume rate of flow (zero reference adjusted according to measured arterial blood velocity information).

An analog computation circuit is shown in FIG. 1 and includes a multiplier 25, a divider 26, another divider 27, another multiplier 28, an inverter 29, a differentiator 30, a dc restorer 31, an integrator 32, a sample and hold unit 33, a recorder 34, and a reset unit 35.

A potentiometer 40 is connected across a voltage source 41 to provide a signal input to the multiplier 25 which is proportional to the length of the section 1. In a typical measurement on a leg, the electrodes 11, 12 may be spaced 15 centimeters. The output $l^2$ of the multiplier 25 is divided by the base impedance $Z_o$ at 26 and this quotient is again divided by the base impedance at 27 producing the quotient $l^2/Z_o^2$.

The ac component $Z_o(t)$ of the base impedance is connected to the multiplier 28 through a capacitor 42 and the inverter 29, with the multiplier output appearing across a potentiometer 43. The arm of potentiometer 43 is set to a value corresponding to the blood resistivity $\rho_a$, and the signal appearing at the potentiometer arm is the pulsating blood volume of equation 1.

The output of the divider 26 is developed across a potentiometer 44 and the arm of this potentiometer may be set to a position corresponding to the resistivity $\rho_o$ of the blood and tissue of the limb, providing an output $V_o$ proportional to the overall tissue volume.

The output of the differentiator 30 is the time derivative of arterial volume as seen in equation 2.

$$dV_a/dt = -(\rho_a\ 1^2/Z_o^2)dZ_o/dt \qquad (2)$$

The dc restorer 31 provides a zero reference value for the time derivative, with the output of the dc restorer integrated over the time interval $t_2-t_1$, typically 10 seconds. The length of the integration is determined by the reset unit 35 which resets the integrator at the end of each integrating time. The integrated total appearing at the output of the integrator at the end of the time period is sampled and held in storage in the sample and hold unit 33 for recording at recorder 34 and/or for transmission to other equipment. The output of the sample and hold unit 33 is developed across scaling resistors 46, 47, with the input to the recorder providing a measure of volume rate of flow of blood in the artery 20 in milliliters per minute.

In the preferred embodiment of the invention, the dc restorer brings the negative peaks of the time derivative to zero, and comparative tests with the instrument of FIG. 1 and with an invasive type electromagnetic flow meter show that the integrated output is essentially proportional to pulsatile arterial flow. Inaccuracies increase when arterial-wall compliance decreases (walls become less distensible). This can happen under conditions of increased pressure (hypertension) or arterial-wall stiffening due to arteriosclerosis. A correction factor for this condition can be applied by direct or indirect measurement of arterial pressure and correlating this with the impedance-derived arterial volume pulsation waveform.

A simple dc restorer circuit for adjusting the negative peaks of the waveform to a zero baseline is shown in FIG. 2. A capacitor 50 is connected between the input and the output. A resistor 51 and a diode 52 are connected between the output side of the capacitor 50 and circuit ground.

A more complex circuit which avoids the small voltage drops in the diode 52, is shown in FIG. 3. A field effect transistor 55 replaces the diode 52, with the gate of the transistor driven from an operational amplifier 56 having the output of the capacitor 50 as one input and having a reference voltage, as from a potentiometer 57, as the other input. The potentiometer 57 may be connected across a voltage source 58, with the potentiometer arm manually set to provide the desired dc level. Alternatively, the blood flow velocity may be measured by a velocity sensor 60 which provides an output to a servo unit 61 for driving the arm of potentiometer 57 to a setting of the dc level corresponding to the measured velocity.

I claim:

1. A method of noninvasively measuring volume rate of flow of blood in an artery, including the steps of:
    measuring the impedance of a section of the body containing the artery;
    computing the rate of change of volume of the artery with time to obtain a time derivative of arterial volume;
    providing a zero reference value for the time derivative; and
    integrating the time derivative over a period of time producing as an integrated output a number substantially proportional to the volume rate of flow of blood in the artery.

2. A method as defined in claim 1 including providing the zero reference value for the time derivative by bringing the negative peaks of the wave to zero.

3. A method as defined in claim 1 including measuring the flow velocity in the artery and setting the zero reference value as a function of the flow velocity.

4. In an apparatus for noninvasive measurement of volume rate of flow of blood in an artery for use with an impedance plethysmograph providing an output signal varying as a function of the impedance of a section of a body having an artery therein, the improvement comprising in combination:
    first means having as an input the plethysmograph output signal $Z_o$ and providing as an output a signal $dV_a/dt$ proportional to the time rate of change of volume of the artery by calculating $$dV_a/dt = -(\rho a\ 1^2/Z_o^2)dZ_o/dt$$

where $\rho_a$ is the resistivity of blood and 1 is the length of the section;
    second means for providing a dc level to a time varying signal and having said first means output signal as an input; and
    integrator means for integrating the input thereto over a predetermined time period and having the output of said second means as an input, with the integrated output of said integrator means being a value substantially proportional to the volume rate of flow of blood in the artery section.

5. Apparatus as defined in claim 4 wherein said second means includes means for setting the negative peaks of the time varying signal substantially to a zero dc level.

6. Apparatus as defined in claim 5 wherein said second means includes a diode and resistor connected in parallel across the first means output.

7. Apparatus as defined in claim 5 wherein said second means includes a transistor and resistor connected in parallel across the first means output, and an operational amplifier having the first means output signal and a reference signal as inputs and having an output connected to the gate of said transistor.

8. Apparatus as defined in claim 4 wherein said second means includes means for varying the dc level as a function of the flow velocity of blood in the artery.

9. Apparatus as defined in claim 4 wherein said second means includes a transistor and resistor connected in parallel across the first means output, and an operational amplifier having the first means output signal and a reference signal as inputs and having an output connected to the gate of said transistor.

10. An apparatus as defined in claim 4 including:
    means for sampling the integrator means output at the end of predetermined time period to obtain a sampled value;
    means for storing the sampled values; and
    means for resetting said integrator means initiating another integrating cycle.

11. Apparatus as defined in claim 4 wherein said first means includes:

means for developing an $l$ signal variable as a function of the length of said section;

means for multiplying the $l$ signal by itself to obtain an $l^2$ signal;

means for dividing the $l^2$ signal by the plethysmograph output signal $Z_o$ two times to obtain a $l^2/Z_o^2$ signal;

means for obtaining an ac signal $-Z_o(t)$ which is the negative of the plethysmograph output signal $Z_o$;

means for multiplying the $l^2/Z_o^2$ and $-Z_o(t)$ signals providing a first product signal;

means for selecting a portion of the first product signal proportional to the blood resistivity $\rho_a$ to obtain a second product signal $V_a(t)$; and means for differentiating said second product signal as a function of time to provide an output signal $dV_a/dt$.

* * * * *